Aug. 1, 1961   JUNNOSUKE KAWA ET AL   2,994,246
ELECTRIC EXPOSURE METER
Filed March 25, 1958   2 Sheets-Sheet 1
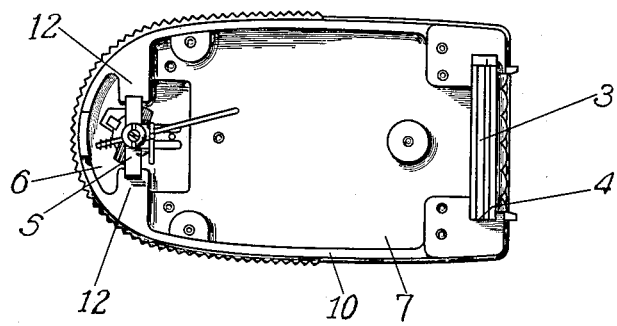
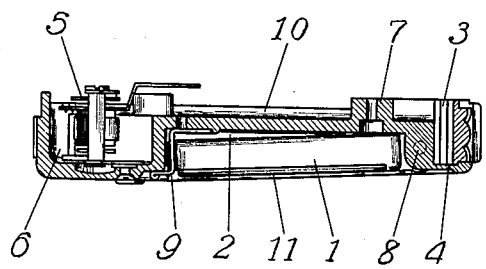
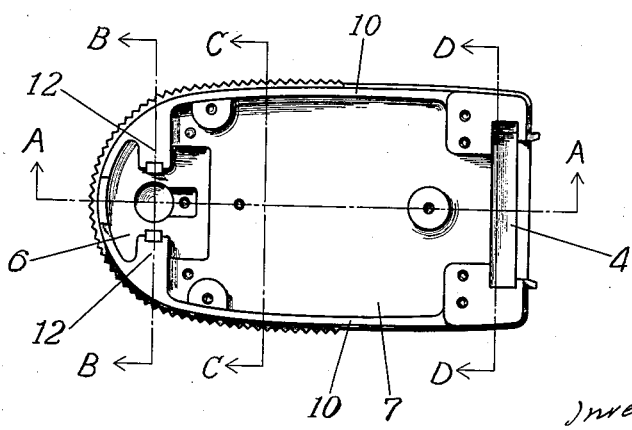

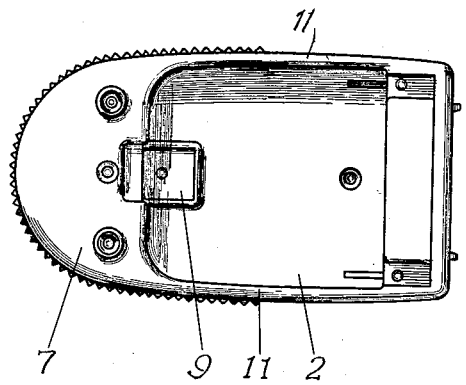
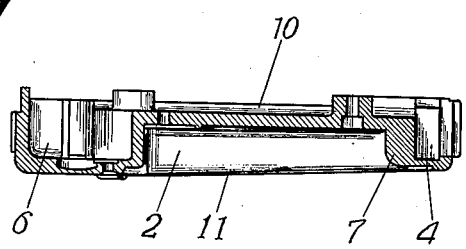
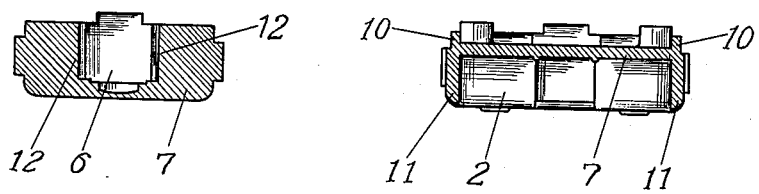
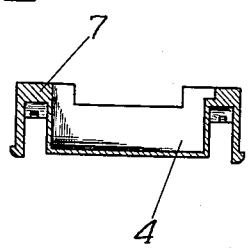

2,994,246
Patented Aug. 1, 1961

2,994,246
ELECTRIC EXPOSURE METER
Junnosuke Kawa, Yoshio Akioka, Itaru Kaneko, and Masao Tatematsu, all of Tokyo, Japan, assignors to Kabushiki Kaisha Sekonic, Tokyo, Japan
Filed Mar. 25, 1958, Ser. No. 723,800
Claims priority, application Japan, March 26, 1957
7 Claims. (Cl. 88—23)

The present invention relates to an electric exposure meter. More particularly, the invention relates to an electric exposure meter equipped with a stationary photocell and an additional photocell of broad surface relative to that of the stationary photocell which additional photocell is movably mounted so that it may be moved out of its housing recess and moved back into its housing recess.

Due to the limited illumination surface size of the first or stationary photocell it is impossible to use said first photocell for measuring a suitable exposure coefficient when the photographic object is dim. For use with dim objects, a second additional photocell larger in size than the first photocell must be connected with an ammeter of the exposure meter. Thus, a photographer has to provide and carry a second photocell of larger size than the first photocell to be connected or disconnected with the exposure meter, as necessary. This is extremely inconvenient and it is desirable that the second or additional photocell be carried with the structure of the exposure meter, although this is not easy due to the large size of said second photocell.

The object of this invention is to provide an exposure meter equipped with a second or additional photocell having a relatively broader or larger surface than a first or stationary photocell. The second photocell may be moved out of its housing recess in the exposure meter and moved back into said housing recess so that the exposure coefficient of a dim object may be measured by measuring light reflected from the object by the joint use of both photocells. Furthermore, the exposure meter of the present invention is not increased in size due to the incorporation of the second movable photocell therein and the exposure meter is conveniently carried and utilized by a user.

In order that the present invention may be readily carried into effect, it will now be described with reference to the accompanying drawings, wherein:

FIG. 1 is a top plan view, with cover and illumination scale plates removed, of an embodiment of an exposure meter of the present invention;

FIG. 2 is a longitudinal sectional view of the embodiment of FIG. 1;

FIG. 3 is a top plan view of a simplified embodiment of FIG. 1;

FIG. 4 is a bottom plan view of the embodiment of FIG. 1;

FIG. 5 is a longitudinal sectional view of the embodiment of FIG. 3 taken along the line A—A of FIG. 3;

FIG. 6 is a cross-sectional view of the embodiment of FIG. 3 taken along the line B—B of FIG. 3;

FIG. 7 is a cross-sectional view of the embodiment of FIG. 3 taken along the line C—C of FIG. 3; and FIG. 8 is a cross-sectional view of the embodiment of FIG. 3 taken along the line D—D of FIG. 3.

In the figures, the main structure of the exposure meter is constructed of Bakelite, plastic and metal materials. The main structure is preferably formed in undulating shape, having a recess 2 at the center of the bottom side wherein an additional or second photocell 1 is interposed. A first or stationary photocell 3 is interposed in a recess 4 near one side of the top of the main structure and an ammeter 5 is housed in a recess 6 near another side of the top of the main structure.

A pivot 8 enables the second photocell 1 to be moved out of its housing recess 2 and moved back into said housing recess. A metal clasp 9 supports the end of the second photocell 1 opposite to that pivotally mounted when said second photocell is in its housing recess 2. Side wall sections 10 and 11 extend around the main structure 7, while supporting projections 12 projecting from both sides of the recess 6 support the ammeter 5 in said recess 6.

Since the structure of the exposure meter of the present invention comprises a recess 4 near one side of the top of the main structure 7 for containing the first photocell 3 to be used for measuring objects of comparatively high illumination, a recess 6 near the opposite side of the top of the structure for an ammeter 5, and a recess 2 at the center part of the bottom of the main structure 7, the whole structure of the exposure meter is of a flat shape and of small size. Upon the positioning of the components in the top of the main structure, the main structure is covered and an exposure coefficient indicating dial is positioned on said top under the pointer or indicator of the ammeter.

The exposure meter of the present invention comprises all required components in a single structure and has a number of advantages over similar types of known devices. It is convenient for a user to carry because of its easily handled overall size resulting from the maximum utilization of space for the second photocell in the body of the meter. Furthermore, it avoids the troubles of attaching and detaching of an additional photocell to the main structure of the meter when photographing objects of weak illumination.

Other advantages of the exposure meter of the present invention are due to the facts that it is convenient to affix a dial for the pointer of the ammeter 5 because the main structure is shaped with the projection at the section adjacent to the recess 6 of said ammeter, that is, the upper part of the recess 2 of the second or additional photocell. Furthermore, each component is separately set in a respective one of the recesses 2, 4 and 6 and none of the components interferes in operation with the others, thus effecting an efficient arrangement.

We claim:

1. In a multi-range light meter, in combination, a support formed with a recess; a first photoelectric cell fixedly mounted on said support for exposure of the effective surface thereof to the light to be measured; a second photoelectric cell having a larger effective surface than the effective surface of said first photoelectric cell, said second photoelectric cell being pivotally mounted on said support for movement between an inoperative position located within said recess and an operative position located substantially outside of said recess, said effective surface of said second photoelectric cell being exposed to the light to be measured when in said operative position; and an indicating instrument mounted on said support and responsive to the output of said photoelectric cells to indicate the intensity of the light measured.

2. In a multi-range light meter, in combination, a support formed with a recess; a first photoelectric cell fixedly mounted on said support and having an effective surface portion facing in a predetermined direction for exposure to the light to be measured; a second photoelectric cell having a larger effective surface portion than the effective surface portion of said first photoelectric cell, said second photoelectric cell being pivotally mounted on said support for movement between an inoperative position located within said recess and an operative position located substantially outside of said recess, said effective surface portion of said second photoelectric cell facing in said predetermined direction when said second photoelectric cell is in the operative position thereof for exposure to the light to be measured; and an indicating instrument mounted on said support and responsive to the output of said photoelectric cells to indicate the intensity of the light measured.

3. In a multi-range light meter, in combination, a support formed with a recess; a first photoelectric cell fixedly mounted on said support and having an effective surface portion facing in a predetermined direction for exposure to the light to be measured; a second photoelectric cell having a larger effective surface portion than the effective surface portion of said first photoelectric cell, said second photoelectric cell being pivotally mounted on said support for movement between an inoperative position located within said recess and an operative position located substantially outside of said recess, said effective surface portion of said second photoelectric cell facing in said predetermined direction when said second photoelectric cell is in the operative position thereof for exposure to the light to be measured; and a current indicating instrument mounted on said support and having an indicating element rotatable about an axis perpendicular to said predetermined direction for movement responsive to the output of said photoelectric cells to indicate the intensity of the light measured.

4. In a multi-range light meter, in combination, a support having a top portion, a bottom portion formed with a recess, and an edge portion connecting said top portion and said bottom portion; a first photoelectric cell fixedly mounted on said edge portion of said support and having an effective surface portion facing in a predetermined direction for exposure to the light to be measured; a second photoelectric cell having a larger effective surface portion than the effective surface portion of said first photoelectric cell, said second photoelectric cell being pivotally mounted on said top portion of said support for movement between an inoperative position located within said recess and an operative position located substantially outside of said recess, said effective surface portion of said second photoelectric cell facing in said predetermined direction when said second photoelectric cell is in the operative position thereof for exposure to the light to be measured; and an indicating instrument mounted on said top portion of said support and responsive to the output of said photoelectric cells to indicate the intensity of the light measured.

5. In a multi-range light meter, in combination, a support formed with a plurality of recesses; a first photoelectric cell fixedly mounted on said support in one of said recesses and having an effective surface portion facing in a predetermined direction for exposure to the light to be measured; a second photoelectric cell having a larger effective surface portion than the effective surface portion of said first photoelectric cell, said second photoelectric cell being pivotally mounted on said support for movement between an inoperative position in another one of said recesses and an operative position in which said second photoelectric cell is substantially located outside said recess, said effective surface portion of said second photoelectric cell facing in said predetermined direction when said second photoelectric cell is in the operative position thereof for exposure to the light to be measured; and an indicating instrument mounted on said support in yet another one of said recesses and responsive to the output of said photoelectric cells to indicate the intensity of the light measured.

6. In a multi-range light meter, in combination, a substantially flat support having a top portion, a bottom portion, and an edge portion connecting said top portion and said bottom portion, said portions each being formed with a recess; a first photoelectric cell fixedly mounted in the recess of said edge portion of said support and having an effective surface portion facing in a predetermined direction for exposure to the light to be measured; a second photoelectric cell having a larger effective portion than the effective surface portion of said first photoelectric cell, said second photoelectric cell being pivotally mounted on said support for movement between an inoperative position in the recess of said bottom portion and an operative position in which said second photoelectric cell is substantially located outside said recess, said effective surface portion of said second photoelectric cell facing in said predetermined direction when said second photoelectric cell is in the operative position thereof for exposure to the light to be measured; and an indicating instrument mounted in the recess of said top portion of said support and responsive to the output of said photoelectric cells to indicate the intensity of the light measured.

7. In a multi-range light meter, in combination, a substantially flat support having a top portion, a bottom portion, and an edge portion connecting said top portion and said bottom portion, said portions each being formed with a recess; a first photoelectric cell fixedly mounted in the recess of said edge portion of said support and having an effective surface portion facing in a predetermined direction for exposure to the light to be measured; a second photoelectric cell having a larger effective surface portion than the effective surface portion of said first photoelectric cell, said second photoelectric cell being pivotally mounted on said support for movement between an inoperative position in the recess of said bottom portion and an operative position in which said second photoelectric cell is substantially located outside said recess, said effective surface portion of said second photoelectric cell facing in said predetermined direction when said second photoelectric cell is in the operative position thereof for exposure to the light to be measured; and an indicating instrument mounted in the recess of said top portion of said support and responsive to the output of said photoelectric cells to indicate the intensity of the light measured, said recesses being aligned along a substantially straight line in the order indicated, and said photoelectric cell being pivotable about an axis transverse of said line and located in the area between the recesses of said edge portion and said bottom portion.

References Cited in the file of this patent

UNITED STATES PATENTS

| 2,063,973 | Anderson | Dec. 15, 1936 |
| 2,129,114 | Bernhard et al. | Sept. 6, 1938 |

FOREIGN PATENTS

| 641,784 | Germany | Feb. 12, 1937 |
| 824,408 | Germany | Dec. 10, 1951 |